United States Patent [19]
Mogi

[11] 4,248,393
[45] Feb. 3, 1981

[54] CASSETTE TAPE STORING CASE

[75] Inventor: Toshio Mogi, Ayaseshi, Japan

[73] Assignee: Lux Audio Kabushiki Kaisha, Toyonakashi, Japan

[21] Appl. No.: 57,677

[22] Filed: Jul. 16, 1979

[30] Foreign Application Priority Data

Jul. 27, 1978 [JP] Japan ............................ 53-104162[U]

[51] Int. Cl.³ .......................... G03B 1/04; G11B 15/32
[52] U.S. Cl. .................................... 242/199; 226/198; 226/189; 242/76
[58] Field of Search ................................ 242/197–200, 242/76; 226/189, 190, 194, 196–199; 360/96, 132

[56] References Cited

U.S. PATENT DOCUMENTS

| 3,043,531 | 7/1962 | Sinkewitsch | 226/197 |
| 3,276,651 | 10/1966 | Bryer | 226/190 |
| 3,642,229 | 2/1972 | Downey et al. | 242/199 |
| 3,674,942 | 7/1972 | Sugaya et al. | 242/199 X |
| 3,710,039 | 1/1973 | McFadden | 242/199 X |

Primary Examiner—Leonard D. Christian
Attorney, Agent, or Firm—Wenderoth, Lind & Ponack

[57] ABSTRACT

A cassette case for containing a magnetic tape in which at least one front guide part which is provided opposing magnetic heads is a movable guide part which operates to incline the magnetic tape from an axial line of said movable part.

10 Claims, 13 Drawing Figures

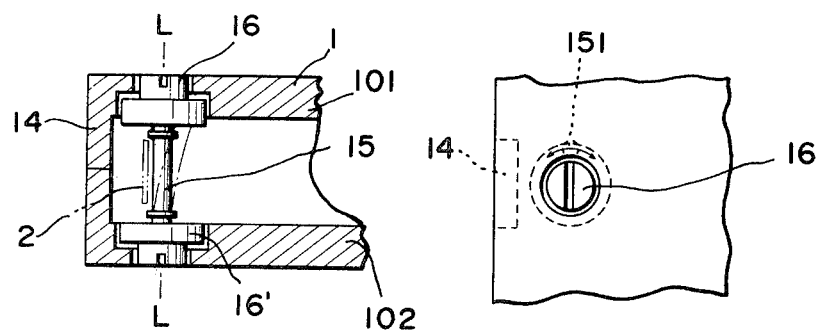
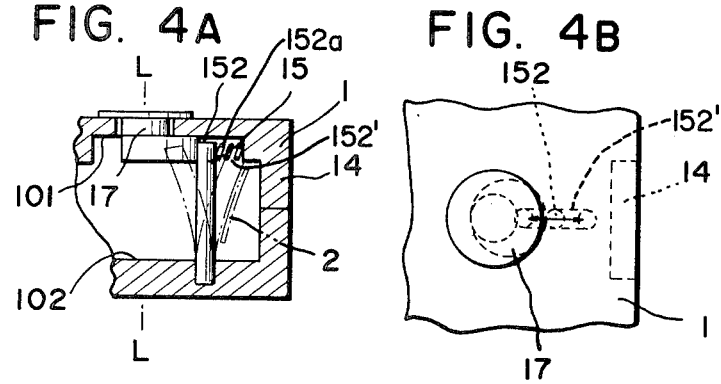
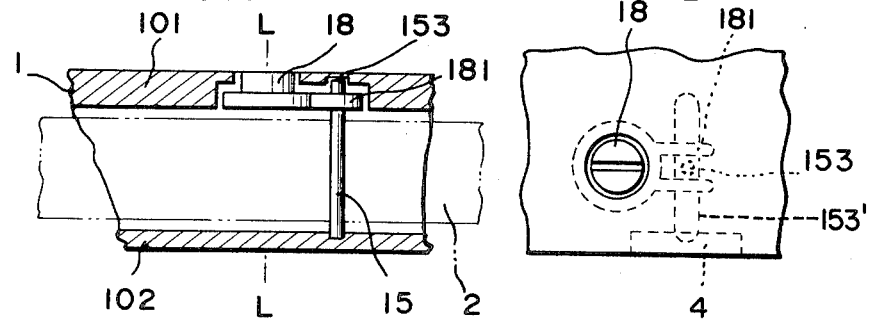

CASSETTE TAPE STORING CASE

BACKGROUND OF THE INVENTION

The present invention relates to a cassette case for a magnetic tape (hereinafter referred to as the cassette case) which contains a magnetic tape therein.

As known, in use of a cassette tape recorder, a problem arises in maintaining the perpendicularity of the magnetic tape in the cassette case, that is, a cassette tape, to the magnetic heads of the cassette tape recorder.

This perpendicularity is not a problem when recording and reproducing a special cassette tape by a so-called two-head type tape recorder which has an erasing head and a recording/reproducing head. However, when using a three-head type tape recorder which is provided with independent magnetic heads for erasing, recording and reproducing, there will be caused an error in the perpendicularity to the recording head and reproducing head since the perpendicularity of the guide part in the cassette case is sometimes in error even when the same type tape recorder is used, and it is necessary to correct the perpendicularity of the cassette tape with respect to these two heads. Even when using a two-head type tape recorder, if the recording and reproduction are carried out by two different units of the same tape recorder, perpendicularity may be in error due to a dimensional error in positioning the cassette case in the respective tape recorders and a difference in the running positions of the tapes in respective tape recorders and therefore phase deviation between right and left channels and deterioration of frequency response will be caused.

For this reason, the conventional cassette tape recorders, particularly three-head type recorders, are provided with an adjusting mechanism which displaces the recording head by an external operation so that the perpendicularity of the recording head can be adjusted relative to the reproducing head.

However, such adjusting mechanism is inconvenient in that the perpendicularity must be adjusted each time the cassette tape is used since the adjusting mechanism actuates only the recording head whereas the perpendicularity of the cassette tape relative to the reproducing head differs individually according to the tape recorder.

Moreover, since the cassette tapes which are currently used have two recording tracks A and B and adjustment of the perpendicularity for track A is ineffective for track B and, the perpendicularity must be adjusted before use of the track B when using the track B after use of the track A. Therefore, the conventional cassette tapes are disadvantageous in that a long interruption is unavoidable in such operation as continuous recording on successive tracks A and B.

SUMMARY OF THE INVENTION

The cassette case for containing a magnetic tape in accordance with the present invention is provided with a plurality of tape guide means which guide the magnetic tape at the front side of the cassette case opposing the magnetic heads of a tape recorder, at least one of these tape guide means having a movable guide part, and said movable guide part has a tape aligner which is constructed to adjust the path of a magnetic tape in its widthwise direction while supporting it and which can incline the tape contact surface of the tape aligner the normal axis of the movable guide part which orthogonally intersects two parallel surfaces of the cassette case so that the perpendicularity of the cassette tape to the magnetic recording, reproducing and erasing heads, particularly the reproducing head, of the tape recorder is ensured by adjusting the inclination of the tape aligner to normal axis of the movable guide part.

BRIEF DESCRIPTION OF THE DRAWINGS

FIG. 3A is a cross sectional side view of a principal part of the cassette case showing another embodiment of said movable guide part, FIG. 3B is a plan view of FIG. 3A, FIG. 4A is a cross sectional side view of a principal part of the cassette case showing another embodiment of said movable guide part, FIG. 4B is a plan view of FIG. 4A, FIG. 5A is a cross sectional front view of a principal part of the cassette case showing another embodiment of said movable guide part, FIG. 5B is a plan view of FIG. 5A.

DETAILED DESCRIPTION OF THE INVENTION

Figure 1:
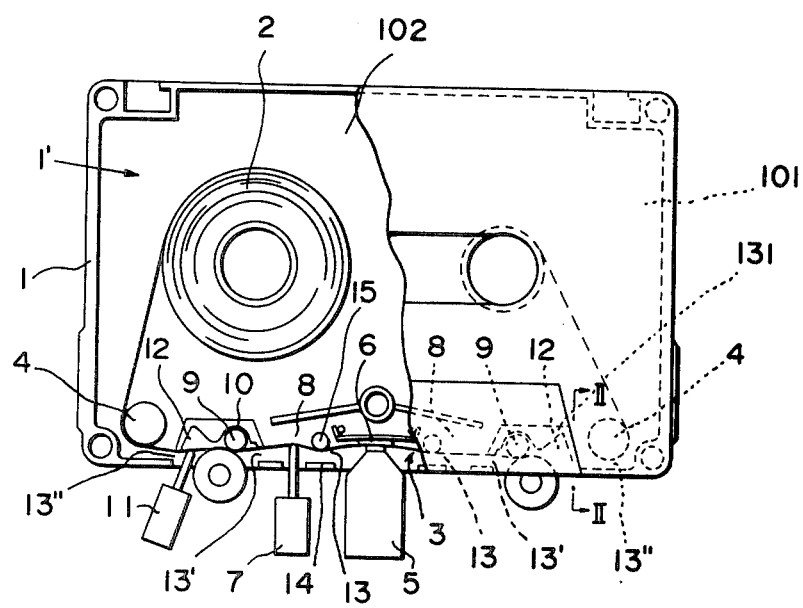
FIG. 1 is a partly cutaway plan view showing the interor of the cassette case in accordance with the present invention.

In FIG. 1, the main body 1 of the cassette case has an interior space 1' formed between two parallel wall surfaces 101 and 102, a pair of reels on which is wound a magnetic tape 2 in the interior space 1' and a tape opening 3 formed at the front side of the main body of the cassette case through which the tape 2 is exposed and past which is run. Side guides are provided at both ends of said tape opening 3 and the reproducing head retainer 6 such as a pad which the reproducing head 5 contacts under pressure through the tape 2 is provided at the center of the tape opening. The recording head retainer 8 which the recording head 7 contacts under pressure through the tape 2 and the shaft hole 10 into which the capstan 9 can be inserted are provided between said reproducing head retainer 6 and the side guides 4, and the erasing head retainer 12 which the erasing head 11 contacts under pressure through the tape 2 is provided between said shaft hole 10 and said guide 4. A group of front guide means 13, 13' and 13" is provided between said reproducing head retainer 6 and the recording head retainer 8, one between the recording head retainer 8 and the shaft hole 10 and one between the shaft hole 10 and the side guide 4, respectively. These front guide means 13, 13' and 13" have respectively a guide space formed by a pair of guide surfaces, for example, the guide wall 14 and the tape aligner 15 consisting of a guide shaft or a guide edge and the guide space is constructed so that the tape 2 is held and guided by the tape guide surface of the tape aligner 15 and the perpendicularity of the tape 2 is set by the tape aligner 15.

At least one of said front guide means 13, 13' and 13" has a movable guide part constituted by the tape aligner 15 to contact the rear surface of tape 2 in the widthwise direction of the tape and vary the inclination angle in the widthwise direction of tape 2, thus adjusting the perpendicularity of the tape 2 relative to the magnetic heads, particularly the reproducing head 5.

When two tracks of a tape are guided by said movable guide part as shown in the embodiment, a group of front guide means 13, 13' and 13" is provided on each end of the opening 3, movable guide part should be provided for the group of front guide means on both sides of the reproducing head 5. In this case, the front guide means 13 near the reproducing head 5 is preferably constructed so as to have the movable guide part.

Figures 2A, 2B:
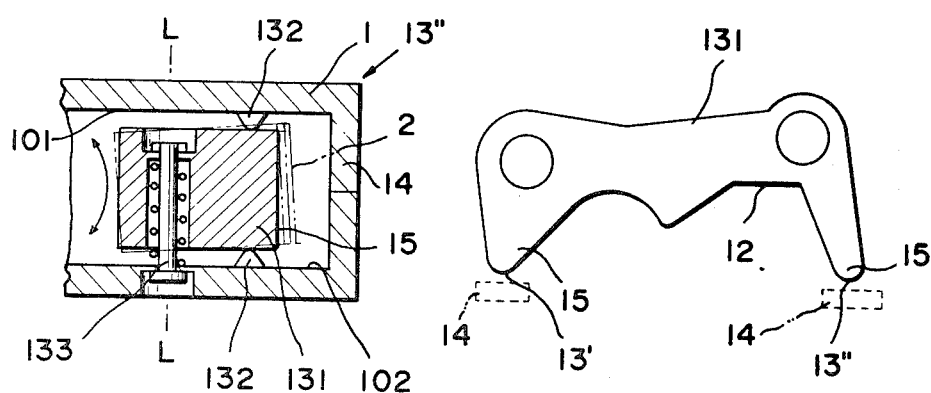
FIG. 2A is a partial cross sectional view of the cassette case taken along the line II—II in FIG. 1.
FIG. 2B is a plan view of the movable guide part shown in FIG. 2A.

Said movable guide part can be constructed as desired; for example, the front surface of magnetic tape 2 can be depressed and inclined and, in the embodiment shown in FIG. 1, the guide edge for two front guide means can be constituted by a single guide member 131 used as the tape aligner 15 for both. In this embodiment, as shown in FIGS. 2A and 2B, the movable guide part is formed by a single guide member 131 in which the tape aligners 15 and 15 of said front guide parts 13' and 13" and the erasing head retainer 12 are integrated. As shown in FIG. 2A, the member 131 is inserted into the main body 1 of the cassette case with a pair of projections 132 provided as spacers on the wall surfaces 101 and 102 opposing each other in the main body 1 and said member 131 can be inclined in the direction of the arrow by the operating means constituted by the screw 133 which pivots the member 131 around the projections 132 as fulcrums ensure inclination of the tape aligners 15 and 15' forming part of the front guide means 13' and 13" to said axial line L. In this embodiment, the projections 132 are provided in the main body 1 of the cassette case but these projections 132 can instead be provided on the member 131. In addition to said embodiment, said movable guide part can be constructed as described below.

In an embodiment shown in FIG. 3A, rotary disks 16 and 16' are provided in the two parallel wall surfaces 101 and 102 of the main body 1 of the cassette case and a guide shaft is provided as the tape aligner 15 and extends between the rotary disks so that the shaft is eccentrically secured at least at one end of the shaft on the rotary disks. When one rotary disk 16' is fixed at a given position and the other rotary disk 16 is rotated, an inclination of the tape 2 to the axial line L of the movable guide part, that is, a line which orthogonally intersects said two parallel surfaces, is obtained and the inclination of tape 2 can be adjusted in accordance with the amount of rotation of the rotary disk 16. Both of said rotary disks 16 and 16' are not always required, but if both ends of the tape aligner 15 are supported by the movable members, it is advantageous in that the movable guide part can be operated from either side of the main body 1 of the cassette case and moreover the perpendicularity of the main body 1 of the cassette case to the standard tape deck can be set by using the rotary disk 16' on the fixing side.

Since the end 151 of the shaft of the tape aligner 15 in this embodiment traces a circular movement as shown in FIG. 3B, the tape aligner 15 can be inclined both in the widthwise direction and in the lengthwise direction of tape 2 in reference to the axial line L.

In case the embodiment shown in FIG. 4A, a guide shaft is used as the tape aligner 15. The tape aligner 15 is made of a resilient material and one end of the tape aligner 15 is fixed in the cassette case and the other end is a free end and is radially guided in slot 152', and the tape aligner 15 can be inclined from the axial line L by moving the free end 152 of the tape aligner 15 against the action of spring 152a by means of the eccentric cam 17. In this embodiment, the end 152 of the shaft of the tape aligner 15 is forced to reciprocate on a straight line as shown in FIG. 4B.

In the embodiment shown in FIG. 5A, the tape aligner 15 is a shaft with one end fixed in the main body 1 of the cassette case and a free end 153 which can swing freely and the inclination of the tape aligner 15 from the axial line L of the movable guide part is obtained by engaging the engaging piece 181 of a rotor 18 with said free end 153 and by moving said engaging piece 181 by rotation of the rotor 18. Also in this embodiment, the end 153 of the shaft of the tape aligner 15 is caused to reciprocate on a straight line by being held in slot 153'.

Figure 6A:
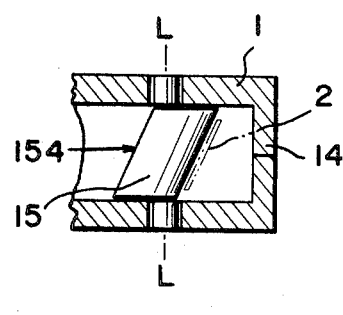
FIG. 6A is a cross sectional side view of a principal part of the cassette case showing another embodiment of said movable guide part.
Figure 6B:
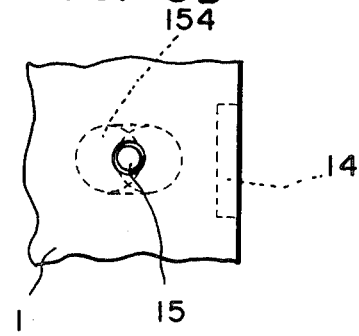
FIG. 6B is a plan view of FIG. 6A.

Moreover, in the embodiment shown in FIG. 6A, the external surface of the tape aligner 15 is an inclined surface 154 which is inclined to the axis and the inclination of the tape 2 from the axial line L of the movable guide part is obtained by rotation of a shaft type tape aligner 15.

Figure 7A:
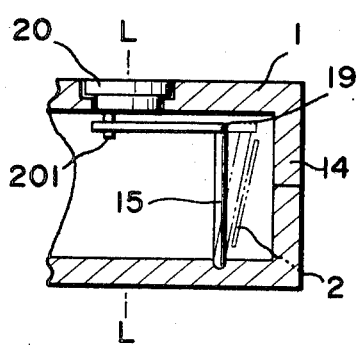
FIG. 7A is a cross sectional side view of a principal part of the cassette case showing another embodiment of said movable guide part.
Figure 7B:
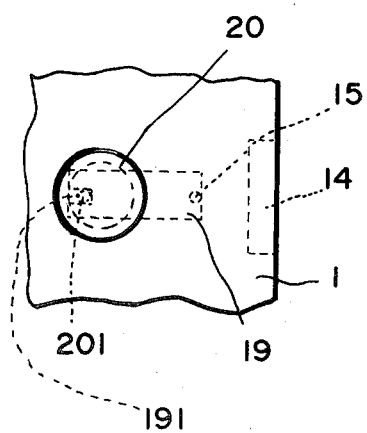
FIG. 7B is a plan view of FIG. 7A.

In the embodiment shown in FIG. 7A, the shaft type tape aligner 15 is inclined from the axial line L of the movable guide part by moving a sliding piece 19 in the direction of the thickness of the tape 2 by rotation of an operating means, for example, a knob 20. The tape aligner 15 has one end fixed and the other free end is freely moved by the piece 19 with which it is engaged. A knob 20 is provided with an eccentric pin 201 which is engaged in a slot 191 of the sliding piece 19.

As described above, the cassette case according to the present invention has in at least one of the front guide means 13, 13' and 13" a movable guide part by which the angle of inclination of the tape 2 from the normal axial position L of the movable guide part can be freely varied. Even though the main body 1 of the cassette case is inclined to the magnetic head due to the inclination of the tape 2 to the normal position of axis L of the movable guide part, such inclination can be compensated for by inclination of the tape aligner 15 to obtain the desired perpendicularity of the tape 2, and the inclination of the tape 2 from the normal position of axis L of the movable guide part can be set for each cassette case; therefore the cassette case the perpendicularity of which has been adjusted for a special tape recorder can maintain its perpendicularity for the corresponding tape recorder and thus adjustments of the tape recorder for each cassette case can be eliminated effectively.

Furthermore, the cassette case according to the present invention is advantageous in that the ruuning position of the tape in the main body of the cassette case can be adjusted, the perpendicularity of the tape 2 can be adjusted to meet the reproducing head even though the recording and reproduction have been done by different tape recorders and the perpendicularity of the pre-recorded cassette tapes sold on the market can be individually adjusted for the user's own tape recorder.

Also the cassette case according to the present invention is advantageous in that the running position of the tape can be changed for each track even when using both tracks A and B of a magnetic tape and therefore the time of interruption between using track A and track B can be greatly reduced by setting the perpendicularity of the tracks A and B in accordance with the tape recorder to be used.

What is claimed is:

1. A cassette case for containing a magnetic tape, comprising:

a main body having two parallel side walls defining an inner chamber therebetween for containing a magnetic tape, and having a front wall with a tape opening therein; and a plurality of front guide means positioned along side said tape opening in the direction of movement of a tape past said opening and each having a tape aligner for contacting the magnetic tape in the direction of the width of the tape for guiding the tape over recording and reproducing heads in a recording-reproducing apparatus in which said cassette case is positioned, the tape aligner in at least one of said front guide means having a guide member with a surface which is for contacting the magnetic tape and said guide member being adjustably movable for moving said tape contacting surface to a position inclined to a line perpendicularly intersecting said two parallel said walls and maintaining it in said inclined position so as to adjust the position of the guided tape relative to the heads in the recording-reproducing apparatus.

2. A cassette case as claimed in claim 1 wherein said movable guide member is a single guide member positioned between said two parallel side walls and having a guide edge thereon for engaging the tape for guiding it, a support member on at least one of the side walls against which said guide member engages, and an operating member connected to said guide member for pivotably moving said guide member around said support member.

3. A cassette case as claimed in claim 2 wherein said guide member has two guide edges thereon spaced in the direction of the movement of the tape along said tape opening for engaging the tape at spaced positions therealong, and said guide member has an erasing head retainer thereon between said two guide edges for being engaged by an erasing head in the recording-reproducing apparatus through a tape.

4. A cassette case as claimed in claim 1 wherein said movable member is on a front guide means adjacent the position at which a reproducing head contacts a tape in the cassette case.

5. A cassette case as claimed in claim 1 wherein said movable guide member is a guide shaft having one end fixed on one of said parallel side walls and the other end movable, and said tape aligner further comprises means for moving the other end of said guide shaft.

6. A cassette case as claimed in claim 5 wherein said moving means is a rotary disk mounted in the other side wall and to which said other end of said guide shaft is connected eccentrically of the axis of rotation of said rotary disk, whereby when said rotary disk is rotated, said guide shaft is inclined.

7. A cassette case as claimed in claim 5 in which said guide shaft is of a resilient material, and wherein said moving means is a rotary cam mounted in the other side wall and with which said other end of said guide shaft is engaged, and spring means engaged with said other end of said guide shaft urging said guide shaft into contact with said cam.

8. A cassette case as claimed in claim 5 wherein said moving means is a rotary member mounted in the other side wall and a sliding strip having one end connected to said rotary member eccentrically of the axis of rotation thereof and the other end coupled with the free end of said guide shaft.

9. A cassette case as claimed in claim 5 wherein said moving means is a rotary member mounted in the other side wall, said rotary member having an engaging member therein, and said other side wall having a slot therein extending transversely to a radial line from the axis of rotation of said rotary member and in which the free end of said guide shaft is movable, said engaging member engaging the free end of said guide shaft for moving said guide shaft back and forth in said slot during rotation of said rotary member.

10. A cassette case as claimed in claim 1 wherein said movable guide part is a guide shaft rotatably mounted between said parallel side walls for rotation around an axis perpendicular to said side walls, said guide shaft having an outer peripheral surface inclined to the axis of rotation of said guide shaft.

* * * * *